(12) United States Patent
Hong

(10) Patent No.: US 8,091,227 B2
(45) Date of Patent: Jan. 10, 2012

(54) METHOD OF REPAIRING AN AIRFOIL SURFACE

(75) Inventor: Shek C. Hong, Glastonbury, CT (US)

(73) Assignee: Hontek Corporation, South Windsor, CT (US)

( * ) Notice: Subject to any disclaimer, the term of this patent is extended or adjusted under 35 U.S.C. 154(b) by 1129 days.

(21) Appl. No.: 11/640,050

(22) Filed: Dec. 14, 2006

(65) Prior Publication Data

US 2007/0231156 A1    Oct. 4, 2007

Related U.S. Application Data

(60) Provisional application No. 60/750,536, filed on Dec. 14, 2005.

(51) Int. Cl.
*B23P 6/00*    (2006.01)

(52) U.S. Cl. .............. 29/889.1; 29/402.18; 427/140; 427/142; 427/290; 427/292; 427/355; 427/356; 427/358; 427/409; 427/429

(58) Field of Classification Search .......... 29/402.18, 29/458, 459, 460, 889.1; 427/140, 142, 290, 427/292, 407.1, 409, 355, 356, 368, 429
See application file for complete search history.

(56) References Cited

U.S. PATENT DOCUMENTS

| | | |
|---|---|---|
| 3,001,973 A | 9/1961 | Piepenbrink et al. |
| 3,124,605 A | 3/1964 | Wagner et al. |
| 3,144,349 A | 8/1964 | Swingler et al. |
| 3,152,162 A | 10/1964 | Fischer et al. |
| 3,201,372 A | 8/1965 | Wagner et al. |
| 3,341,878 A * | 9/1967 | Hubbard ............... 15/235.4 |
| 3,394,164 A | 7/1968 | McClellan et al. |
| 3,513,491 A | 5/1970 | Gordon |
| 3,644,457 A | 2/1972 | Konig et al. |
| 3,738,947 A | 6/1973 | Fishbein et al. |
| 3,769,318 A | 10/1973 | Windemuth et al. |
| 3,832,311 A | 8/1974 | Windemuth et al. |
| 4,088,665 A | 5/1978 | Findeisen et al. |
| 4,097,951 A * | 7/1978 | Hurtt ............... 15/245.1 |
| 4,101,497 A | 7/1978 | Charves et al. |
| 4,110,317 A | 8/1978 | Moraveck |
| 4,294,719 A | 10/1981 | Wagner et al. |
| 4,344,855 A | 8/1982 | Schafer et al. |
| 4,580,944 A | 4/1986 | Miller |
| 4,847,122 A * | 7/1989 | Goldberg et al. ............ 427/410 |

(Continued)

FOREIGN PATENT DOCUMENTS

BE    752261    1/1970

(Continued)

OTHER PUBLICATIONS

Shek C. Hong, Advanced Rain and Dust Erosion Resistant Coating Systems, May 22-24, 2001, Aerospace Coatings Removal and Coatings Conference, San Antonio Texas.

(Continued)

*Primary Examiner* — Essama Omgba
*Assistant Examiner* — Sarang Afzali
(74) *Attorney, Agent, or Firm* — Michaud-Kinney Group LLP

(57) ABSTRACT

This invention relates to the repair and removal of erosion or impact damage using hand sandable elastomeric coatings on a curved substrate, particularly such surfaces as the leading edge of the airfoil. Specialized applicators and methods of use are also disclosed.

32 Claims, 5 Drawing Sheets

U.S. PATENT DOCUMENTS

| | | | |
|---|---|---|---|
| 5,126,170 | A | 6/1992 | Zwiener et al. |
| 5,236,741 | A | 8/1993 | Zwiener et al. |
| 5,306,120 | A | 4/1994 | Hammer et al. |
| 5,449,273 | A | 9/1995 | Hertel et al. |
| 5,486,096 | A | 1/1996 | Hertel et al. |
| 5,611,102 | A | 3/1997 | Lesinsky et al. |
| 5,726,272 | A | 3/1998 | Yonek |
| 5,736,604 | A | 4/1998 | Luthra |
| 5,743,494 | A | 4/1998 | Giamati et al. |
| 6,013,326 | A | 1/2000 | Flosbach et al. |
| 6,341,747 | B1 | 1/2002 | Schmidt et al. |
| 6,399,736 | B1 | 6/2002 | Primeaux, II et al. |
| 6,436,540 | B1 | 8/2002 | Garcia et al. |
| 6,461,689 | B1 | 10/2002 | Gauthier et al. |
| 6,649,107 | B2 | 11/2003 | Harrison et al. |
| 6,747,117 | B2 | 6/2004 | Gajewski |
| 6,828,405 | B1 | 12/2004 | Cai |
| 6,878,771 | B2 | 4/2005 | Urs |
| 7,033,673 | B2 * | 4/2006 | Wiedemann et al. ......... 428/447 |
| 2002/0160205 | A1 | 10/2002 | Garcia et al. |
| 2004/0063844 | A1 | 4/2004 | Urs |
| 2004/0067315 | A1 | 4/2004 | Niesten et al. |
| 2004/0096331 | A1 | 5/2004 | Leach |
| 2004/0118978 | A1 | 6/2004 | Anning |
| 2005/0100674 | A1 | 5/2005 | Brown et al. |
| 2005/0169763 | A1 | 8/2005 | Anning |

FOREIGN PATENT DOCUMENTS

| | | |
|---|---|---|
| DE | 1022789 | 9/1956 |
| DE | 1027394 | 4/1958 |
| DE | 1092007 B | 11/1960 |
| DE | 1101394 B | 3/1961 |
| DE | 1222067 B | 8/1966 |
| DE | 1929034 A1 | 12/1970 |
| DE | 2004048 A1 | 12/1970 |
| DE | 1953012 A1 | 4/1971 |
| DE | 2504400 A1 | 8/1976 |
| DE | 2537685 A1 | 3/1977 |
| DE | 2552350 A1 | 5/1977 |
| EP | 1038897 A2 | 9/2000 |
| EP | 1295649 A2 | 3/2003 |
| EP | 1403245 A1 | 3/2004 |
| GB | 761626 | 11/1956 |
| GB | 994890 | 6/1965 |
| NL | 7102524 | 8/1971 |
| WO | 02072420 A1 | 9/2002 |
| WO | 2006055038 A1 | 5/2006 |
| WO | WO2006/0055038 A | 5/2006 |

OTHER PUBLICATIONS

Shek C. Hong, High Performance Rain and Sand Erosion Resistant Sprayable Coatings and Molding Resins for Erosion Protection of Aircraft, Aging Aircraft Conf. 2005 Palm Springs.

International Search Report and Written Opinion, dated Aug. 7, 2007. Search Report dated Aug. 27, 2008.

Hong, Shek C., U.S. Army Field Trial of Hontek Coatings on Black Hawk Helicopters, Apr. 2007, Aging Aircraft Conference.

E. Charves, Synthesized Ketimine a replacement curing agent for MOCA, Jan. 22, 1976, Naval Air Systems Command, Dept of Navy, Washington, DC.

Shek C. Hong, Advanced Rain and Dust Erosion Resistant Coating Systems, Nov. 5-9, 2000, 32nd International SAMPLE Technical Conference.

Shek C. Hong, Advanced Rain and Dust Erosion Resistant Coating Systems, May 22-24, 2001, Aerospace Coatings Removal and Coatings Conference, San Antonio.

Shek C. Hong, High Performance Rain and Sand Erosion Resistant Sprayable Coatings and Molding Resins for Aircraft, Feb. 2005, The 8th Joint NASA/FAA/DOD Conf. on Aging Aircraft.

International Search Report and Written Opinion for PCT/US2006/048092 dated Jul. 8, 2007.

International Search Report and Written Opinion for PCT/US2008/065480 dated Aug. 27, 2008.

Erapol E90A, High Performance Polyether Based Urethane Elastomer, Feb. 20, 2003.

* cited by examiner

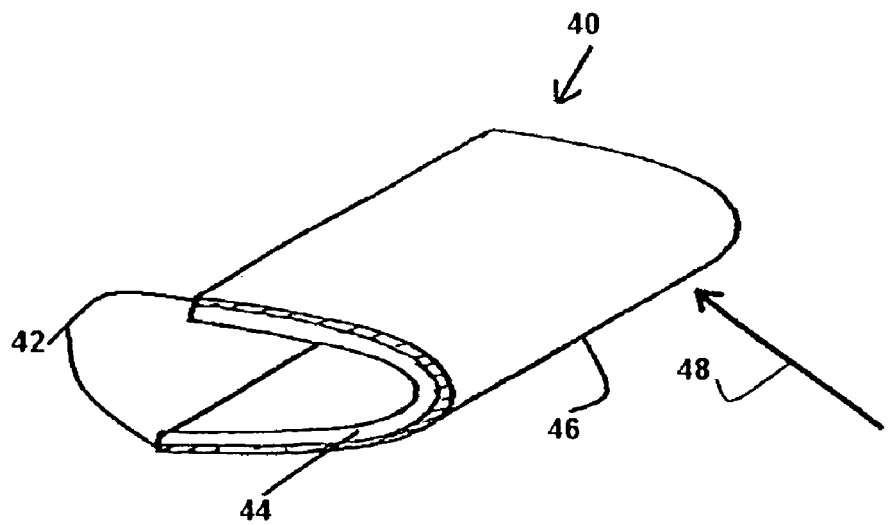
FIG. 3
FIG. 4
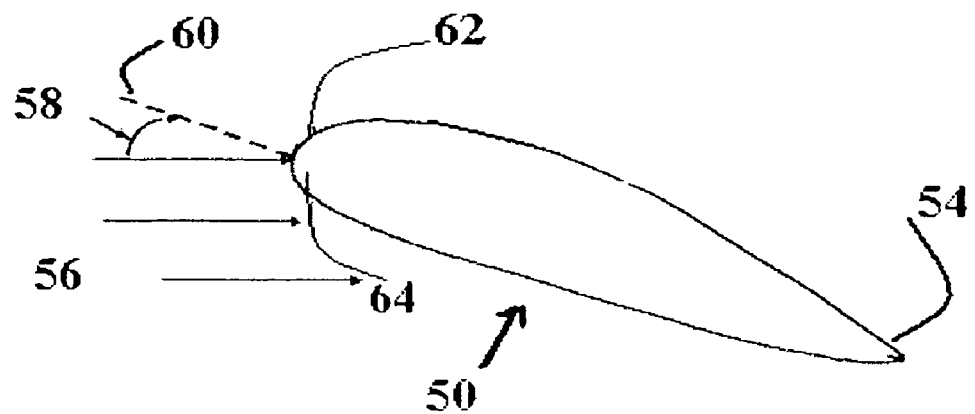

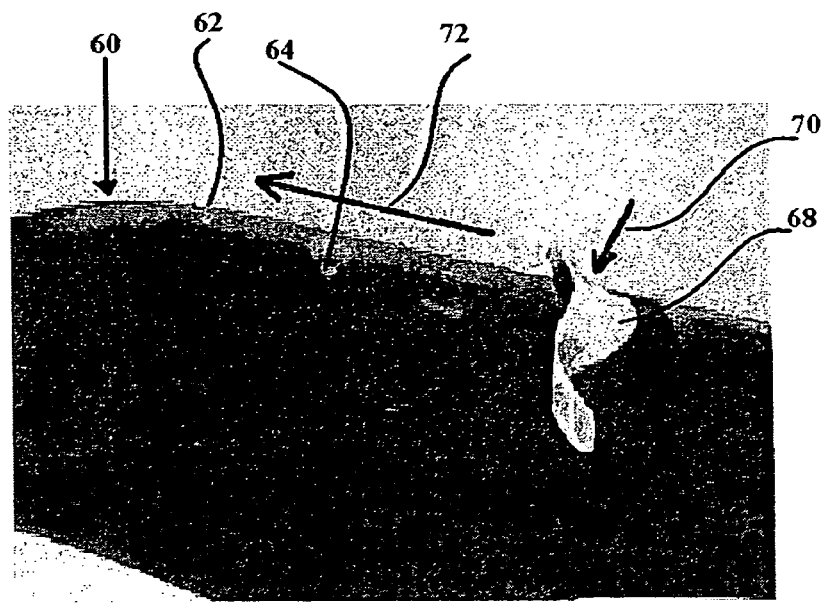
FIG. 5
FIG. 6
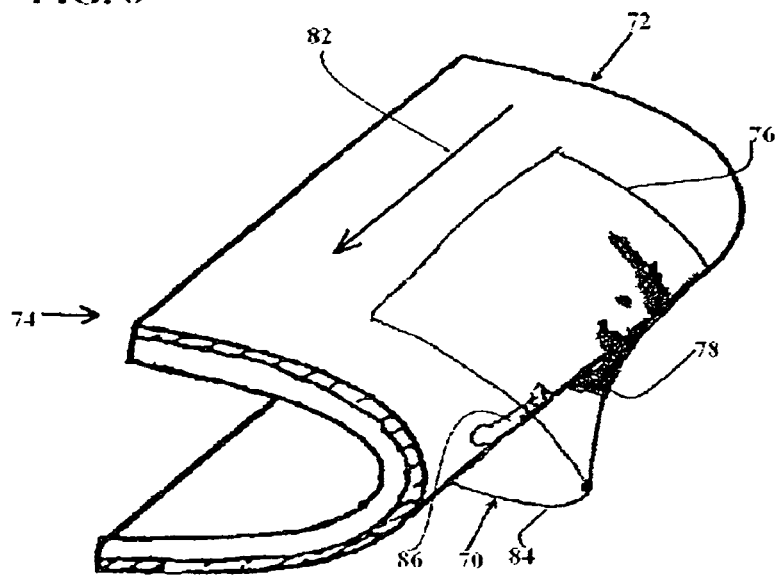

METHOD OF REPAIRING AN AIRFOIL SURFACE

CROSS REFERENCE TO RELATED APPLICATION

This patent application is related to and claims priority under 35 U.S.C. §119(e) of U.S. Provisional Patent Application Ser. No. 60/750,536, entitled "Method of Protecting and Repairing a Surface," filed on Dec. 14, 2005. The disclosure of this patent application is incorporated by reference herein in its entirety.

FIELD OF THE INVENTION

This invention relates to the repair and removal of erosion or impact damage to elastomeric coatings on a curved substrate, particularly such surfaces as the leading edge of the airfoil which may take the form of a wing, a rotor blade, a turbine blade, a propeller blade, a fan blade, an aircraft radome or antenna which have similar arcuate leading surfaces. The method is also useful for other flat and contoured surfaces.

BACKGROUND OF THE INVENTION

Elastomeric polymeric compositions are used to protect structures with forward facing surfaces, such as wings, rotor blades, propeller blades, fan blades, turbine blades, aircraft radome, and aircraft antennas. These structures can be severely damaged when used in their intended operational environments. The term "erosion damage" is a broad term encompassing damage caused by rain erosion, sand and dust erosion as well as impact damages caused by stone, gravel or foreign objects encountered typically in flight conditions.

Elastomeric erosion resistant coatings are supplied in the forms of tapes, sheets, molded boots and sprayable coatings. Currently available elastomeric polyurethane coatings used in erosion protection application are highly sand erosion resistant, demonstrating higher sand erosion resistance than metal. However, elastomeric polyurethane coatings have lower rain erosion resistance than metal, usually exhibiting rain erosion damage in the form of deep pits, cracks, craters, and holes. The size, shape and location of the damage sites vary depending on the nature of the damage. The size and shape can vary from crack lines as thin as hair lines, pits about 1 mini-meter or smaller in diameter, craters about 2 to 3 mini-meter in diameter, or irregularly shaped holes wider than 1 centimeter across. The damage sites can exist isolated and randomly distributed, or continuous across the forward facing surfaces.

When these erosion damages occur, it is extremely difficult to conduct repairs on the rain eroded polyurethane elastomers. The high sand erosion resistance makes it extremely difficult to remove the coatings by hand sanding. For helicopters, removal of the current types of erosion protection coating by mechanical or chemical means requires the removal of the rotor blades from the aircraft and typically removal by machine sanding or other techniques. The reapplication of the tape, molded boot and sprayable coatings in the field is very labor intensive and costly.

Another method to remove the damaged coating uses chemical strippers. This method also requires the removal of the rotor blades from the aircraft, as the open air will dry out the chemical stripper very quickly. Another problem is that chemical stripping introduces hazardous chemicals into the operation. In addition, typical erosion resistant coatings are used at a thickness equal or greater than 0.014". It usually takes overnight soaking to soften the coatings so that they can be removed. There are also concerns that the stripper solution may swell and damage the composite structure under the erosion resistant coatings. For these reasons, it is not practical to do field repair with chemical stripper.

Possible methods that could be used to repair the erosion damage involve brushing on repair material and spraying on the repair materials. Neither of these methods is entirely satisfactory to fill in the cracks, holes of varying sizes and shapes on a curved surface, while still maintaining a smooth, aerodynamic surface at the end of the repair operations. The extra layers simply follow the irregular contours of the damaged surfaces interfering with aerodynamics of the airfoil. None of the methods employed to date have satisfactorily provided a method to field repair a rotor blade which has erosion damage.

It is an object of this invention to provide a method to efficiently fill in the pits, cracks, craters, and holes of varying sizes and shapes on a curved surface.

It is an object of this invention to provide a method to repair airfoil structures such as the rotor blades that can be accomplished in the field.

It is a further object of this invention to repair the rotor blade or other leading edge structure while the blades are still mounted on the aircraft or equipment, It is an additional object to design an erosion protection system that can be removed and/or repaired in the field, without power tools or chemical strippers.

It is another objective of this invention to provide an erosion protection coating system for airfoils and a repairable resin system for airfoils with contrasting colors to allow early detection of erosion, impact and other damages, and to allow fast repair to lengthen the service life of the blades or structures.

SUMMARY OF THE INVENTION

One embodiment of the invention relates to a method of repairing an airfoil surface having a plurality of damage cavities caused by erosion or impact damage comprising filling said plurality of damage cavities in said surface with a liquid repair material using a flexible applicator capable of conforming to the surface of said airfoil surface while being drawn lengthwise along the airfoil surface. This method may include the preliminary steps of sanding the portion of said airfoil surface containing said plurality of damage cavities with abrasive material and applying an optional primer coat over sanded areas. The liquid repair material is preferably formulated as an elastomeric basecoat and an erosion resistant topcoat may optionally be applied over the basecoat. The erosion resistant topcoat is preferably more sand erosion resistant than the underlying elastomeric basecoat.

Another embodiment is directed to an elastomeric airfoil erosion protection coating for visual detection of water and sand erosion damage comprising having the elastomeric basecoat of a contrasting color to the color of the topcoat layer which is visible on the outer surface. This system of contrasting colored coating layers provides visual detection of any damage by detecting the appearance of the contrasting color the underlying layers thereby indicating damage in the area. In another related aspect, there are three contrasting colored layers (a) a primer of a first color applied directly on a structural substrate of said airfoil surrounding a leading edge of said airfoil; (b) a basecoat of a second color applied over said primer; and (c) a topcoat of a third color on top of said basecoat, wherein said first color, second color and third color are contrasting colors allowing visual detection of damage to said protection coating by visual inspection to detect the appearance of the second color of said basecoat or first color of said primer indicating damage in the area. The contrasting colored coating system is used in a method of detecting damage to an airfoil erosion protection coating allowing the slight damage to be repaired before the airfoil substrate is damaged, thereby prolonging service life. The repair method described above is useful for such repair.

Still another embodiment is directed to a method of making an airfoil leading edge erosion protection coating capable of being field repairable by hand sanding comprising applying to an airfoil substrate a coating system composed of a hand sandable basecoat and a topcoat, said basecoat being of lower sand erosion resistance than the topcoat and said basecoat constituting at least 50% of the total coating thickness. A related aspect relates to repairing said erosion protection coating by sanding the damage cavities until all irregular edges extending above the surface of said coating have been sanded until said edges are flush with the surface; applying a repair basecoat to fill said plurality of cavities to form filled cavities; and finally applying a repair topcoat layer over the filled cavities.

Still another embodiment is a field repairable polymeric erosion protection composition positioned on and adhered to a leading edge surface of an airfoil comprising an elastomeric base composition loaded with fillers sufficient to render the polymeric erosion protection composition hand sandable, said base elastomeric base composition tested in accordance with ASTM D412-92 prior to incorporation of said fillers having a minimum tensile strength of 1000 psi, an elongation at break of at least 200%, and a Shore A hardness of less than 95 A.

A further embodiment is directed to a repairable elastomeric coating for a leading edge surface of an airfoil comprising (a) an elastomeric, hand sandable basecoat disposed surrounding said leading edge surface having a sand erosion rate above 0.020 grams/cm$^2$; and (b) an elastomeric topcoat disposed on top of said elastomeric basecoat having a sand erosion rate below 0.020 grams/cm$^2$. Preferably the basecoat constitutes at least 50% of the total coating thickness.

A still further embodiment relates to a single layer erosion resistant elastomeric coating adhered to a leading edge surface of an airfoil comprising a single layer of an elastomeric basecoat adhered on said leading edge of said airfoil having a sand erosion rate above 0.020 grams/cm$^2$ and a water erosion rate of greater than 100 minutes.

An embodiment utilizing applicators which are preformed to conform to the cross sectional contour of the leading edge surface of an airfoil are useful on long uniform cross section leading edge application, and it utilizes an applicator comprising a body having an open interior area defined by at least one interior wall, said wall having a wiping edge at a distal end thereof and a front edge generally opposite said wiping edge; said wiping edge defining a contour complimentary to a leading edge surface of an airfoil; said front edge defining a contour shaped to form a pocket between said leading edge surface of said airfoil and said interior wall; and wherein during operation an elastomeric material is resident within said pocket so that as said applicator is drawn along said leading edge surface of said airfoil said elastomeric material is deposited on said leading edge surface of said airfoil and follows the shape defined thereby. This applicator may have a handle incorporated therein and a inlet device to allow for feeding in of the elastomeric repair materials by various supply methods including squeeze bottles, caulking gun-type devices and dispensing devices which meter and premix the elastomeric repair material.

An additional embodiment relates to an airfoil repair kit comprising a flexible applicator capable of conforming to a leading edge surface of an airfoil; and at least one an elastomeric, hand sandable repair material along with optional kit components of sanding discs, a primer, an elastomeric basecoat, an elastomeric topcoat, brushes, and a sprayer.

BRIEF DESCRIPTION OF THE DRAWINGS

FIG. 3 is a partial section of the leading edge portion of an airfoil structure used for laboratory testing coated with elastomeric erosion coating.

FIG. 4 is a cross sectional schematic view of an airfoil shape with major airfoil or hydrofoil elements identified FIG. 5 is a perspective view of a leading edge being repaired using a flexible applicator FIG. 6 is partial section of the leading edge portion of an airfoil structure showing sand and water erosion damage being repaired using a specially formed flexible applicator.

DETAILED DESCRIPTION OF THE PREFERRED EMBODIMENTS

Figure 1:
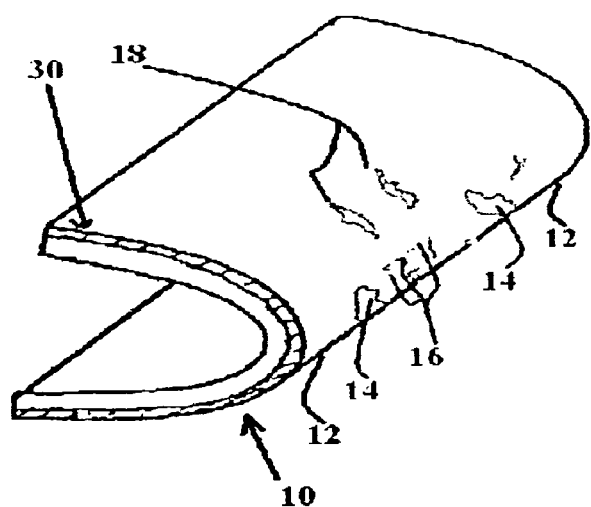
FIG. 1 is partial section of the leading edge portion of an airfoil structure showing sand and water erosion damage.
Figure 2:
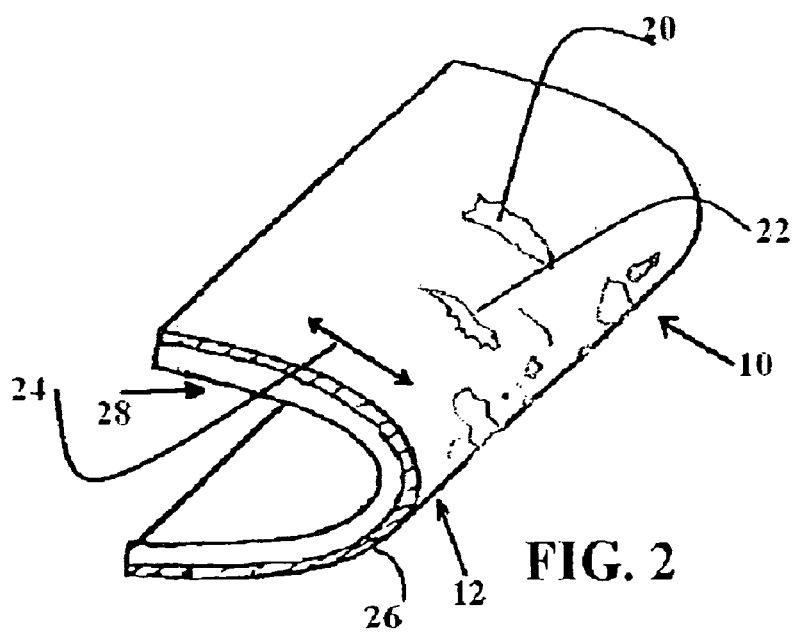
FIG. 2 is a partial section of the leading edge portion of an airfoil structure showing more severe sand and water erosion damage.

FIGS. 1 and 2 show a time lapse sequence of the erosion damage progression on an airfoil shaped structure 10, the leading edge portion 12 of which is shown in FIGS. 1 and 2 in sectional view. Rain erosion and impact damage (14 and 16) typically occurs at the front of the leading edge 12, while sand or solid particle erosion tends to focus on the contour surfaces slightly away from the leading edges. Rain erosion typically caused pits, craters, and holes, while sand erosion typically produces uniformly matte surface appearance and very shallow erosion hole patterns. FIG. 2 illustrates a later stage of erosion damage using the same section from FIG. 1. In FIG. 2 the most severe erosion sites 20 and 22 occurs when the surface is first eroded by sand or dust particles, and then followed by rain erosion. Under this mixed sand/rain environment, the side surfaces region 24 surrounding the leading edges are typically eroded into deep pits and craters very quickly.

Certain embodiments relate generally to the repair of an elastomeric coating 26 on a curved surface 28 of an airfoil shaped structure 30 as illustrated in FIGS. 1 and 2 as rotor blade 10. The elastomeric coating 26 is defined as a flexible coating based on elastomeric polymer composition. The coating may contain no filler or it may contain fillers. The presence of filler may stiffen up the coatings to the point of relatively little elastomeric physical character, but these filled coatings are still regarded as "elastomeric coatings" for use in various embodiments of this invention.

FIG. 3 shows the test airfoil 40 which is a mock-up of the partial airfoil leading edge section of an actual rotor used to simulate actual damage from water and sand impingement in a controlled environment. The elastomeric coating 42 is deposited on the underlying substrate 44 surface area of the whole test airfoil. The leading edge 46 is the focal point for the impingement of water and sand during testing shown by directional arrow 48. All along the leading edge 44 and all the adjacent surfaces represented by this test airfoil damage occurs by the appearance during testing of the erosion damage cavities shown in FIGS. 1 and 2.

FIG. 4 illustrates by a cross-sectional diagrammatic representation of the convention structural portions of a typical airfoil 50 having a leading edge 52 and a trailing edge 54 with the oncoming wind direction shown as arrow 56, the angle of attack 58 is the angle between the wind direction and the chord 60 of the airfoil 50 shown as a dashed line 60.

The wind carries sand and rain and debris into contact with the leading edge 52 and impinges on its contoured surfaces 62 and 64 on either side of the leading edge. These leading edge areas are the test surfaces simulated by the test airfoil of FIG. 3. and are generally where the damage occurs as best shown in the drawing representations in FIGS. 1 and 2.

Terminology Definitions

The term "airfoil" as used throughout this specification is meant to be more expansive than the conventional airfoil shaped structure in FIG. 4 and will also encompass structures such as hydrofoils which have an aerodynamic shape that is somewhat different than FIG. 4 but are similarly subject to wind or water carried sand and debris. Such included shapes are radomes shape which would have a leading edge in the form of a narrowed point rather than the leading edge which is geometrically a line in FIG. 4 airfoil form. Aircraft antennae are shaped to allow smooth airflow around them and are considered within the term "airfoil" as are other devices benefiting from the advancement of the embodiments such as windmill blades, turbine blades, runner blades, fan blades, compressor blades, propeller blades, vanes, stay vanes, hydroelectric turbines, marine propellers, hydro turbines, gas turbines, tide mills, windmills, compressors, pumps, blower, impellers, propellers, and many kinds of fans all of which have the common feature of having fluid passing by the surfaces which may carry damaging sand and debris.

The term "leading edge" will similarly be understood to have a broader meaning than shown in FIG. 4 and should be defined as a narrowed surface designed to encounter the wind or other fluid such as water. It is may be an elongated narrowed edge in the case of a rotor blade, wing, antenna, windmill blade or a sharper edge surface as in a propeller blade or a forward wind encountering point area as in a radomes (which may have a blunt conical form or other generally rounded shape).

The term "elastomeric" as used herein generally is understood to be any flexible material which has an ultimate elongation at break as measured by ASTM D412-92 of at least 40% at break, preferably 80% and more preferably 100%.

The terms "sprayable" or "spray-applied" or "sprayed" all are meant to mean materials that are coated and bonded onto a substrate, such as an airfoil, particularly the leading edge and surrounding areas using spray techniques. This terminology distinguishes elastomeric materials that may be applied to the substrate as a premolded and/or preshaped boot of elastomeric material, a preformed tape material which is adhered to the airfoil or a preformed sheet that may be bonded to the airfoil.

The term "hand sandable" is understood to mean a material whose surface is abraded away as loose debris within one minute of hand sanding. The hand sanding is done on a properly supported 1.5"×3" area of the test material using moderate downward pressure with 80 grit aluminum oxide sandpaper. A "hand sandable" coating is characterized by the sample being able to be sanded by hand pressure into powder in less than 15 seconds without gumming up or rolling up as an agglomerate. Excellent sandability preferably included one or more of the following additional properties: 1) sanding debris is coming off from the coating within 10 seconds of sanding, 2) Low friction during sanding, 3) No heat or low heat generation after one minute of hand sanding with normal effort, 4) Loose sanding debris in free flowing powder form, instead of gum up or rolled up agglomerate, 5) the amount of sanding residue on sanding disc is equal to or less than the amount left on the coating after sanding. Using the Particle Erosion Test Apparatus, we have found that materials with sand erosion rate of less than 0.020 grams are difficult to sand by hand. To be hand sandable by the definition of this invention, the material should have a sand erosion rate of higher than 0.020 grams, preferably higher than 0.030 grams and 0.040 grams. Materials having sand erosion rates between 0.02 and 0.03 sometimes exhibit slightly more difficult hand sanding characteristics.

It has been found to be very difficult to repair the pits, craters, and holes scattered throughout the leading edge of a helicopter rotor blade or other leading edge surfaces. Common repair techniques of using a putty knife and putty-like solid repair resin do not work well in this application. The damage sites can be too small for a material with putty consistency to flow in. The putty knife cannot repair a curved surface either.

A helicopter rotor blade or other leading edge structures are well defined aerodynamically shaped surface. The airfoil shape of the rotor blade is characterized with a very sharp curve at the leading edge. A repair resin must have the proper viscosity so that it does not run or drip from the sharp curve during the repair procedure. Any repair to the blade surface must minimize the distortion of the aerodynamic contour.

The difficulty of repairing a damaged elastomeric surface has limited the total service life of an elastomeric erosion protection system on a helicopter rotor blade. Currently, elastomeric molded boot and self adhesive polyurethane tape are used to protect the blades. Once the damage occurs on surface and in the body of the elastomeric materials, the self adhesive elastomeric tapes may encounter sudden catastrophic adhesion loss and fly away from the rotor blades during flight, which become a safety concern for aerodynamic balance of the rotors. The alternative existing elastomeric covering of a rotor takes the form of a preformed, molded boot that is adhesively bonded to the blade substrate. The elastomeric boot is usually left to erode until not usable and then replaced. Replacing the tape, and the boot are both very labor intensive operations, involving the removal of the rotor blade from the helicopter, stripping off all old coatings by a variety of methods, applying some replacement elastomeric materials and then carefully conducting weight balancing of the blade after the repair procedure. If the field unit is not equipped to do the repair, the entire rotor blade must be sent back to a depot facility to do the repair and overhaul. The transportation of the rotor blades is costly and time consuming.

Another deficiency of the current erosion protection methods is the lack of an early erosion indicator that enables the user to take preventive action to stop the erosion going all the way through the elastomeric coating and ultimately into the substrate. The commercial erosion resistant sprayable coatings use one color gloss or matte color schemes. If a basecoat and a matte topcoat are used, the prior art coating systems typically use a gloss or semi-gloss basecoat, and a matte topcoat, both of the same or very similar colors. In these systems, even though the underlying primer or adhesive of different texture or different colors may be utilized, the total system does not provide sufficient warning for the users to take preventive actions when there is slight damage to the elastomeric coating. Once the underlying primer or adhesive is exposed, the elastomeric protective coating is damaged to the point of not being serviceable any longer. This inability to detect early and slight damage shortens the service life of the rotor blades and other airfoil-type structures with leading edges, such as radomes and antenna structures on the aircraft. Because the prior art elastomeric erosion protection materials typically erode to the substrate with deep cratering and pitting, the damage usually reach the substrate before any corrective actions can be taken. This can be detrimental to a composite structure as the underlying composite layers of the rotor or airfoil can be punctured through by rain erosion in a very short period of time.

Still another deficiency of the existing erosion protection systems is the difficulty of coating removal from the substrate. Coating removal is an essential part of a successful field repair procedure. An elastomeric erosion resistant coating by its nature is very difficult to remove. The common methods use a solvent based stripper to soak through the coating to soften or dissolve the primer. Typical primers suitable for such procedure include polyvinyl butyral based wash primers. While the procedure works well to remove the erosion resistant coatings, the use of excessive amount of hazardous solvents is not desirable. In addition, it takes a long time, typically overnight soaking, to soften or dissolve the primer. In a military or other emergency operations, the helicopter cannot be out of service for many hours, waiting for this lengthy repair procedure.

Many advantages can be achieved by the repair methods and procedures in the embodiments described hereafter.

The field repair of the cavities caused by rain erosion or impact damage on the curved surfaces of an airfoil structure can be accomplished with the use of a flexible airfoil contour applicator also called a Flexible Applicator (FA) as described more fully below. Additional steps in the repair of rotor blade damage may include one or more of the following steps: 1) Surface preparation including sanding, 2) Application of primer, 3) Application of basecoat, and 4) application of topcoat.

1. Surface Preparation Step

On a rain or impact damaged surface, there are holes and cut surfaces, with some remaining debris hanging around the wells of the craters, pits and holes. This "raised" debris must be removed or smoothed to correspond with the surrounding contoured surface. Exacto knives can be used, but are discouraged due to the risk of damage to the composite substrates. We have found that a pair of scissors, most preferably curved scissors, can be used to trim off the raised debris. The curved scissors has a curvature that can touch the damage sites at proper angle to trim off the debris. This is especially helpful in the surface preparation of sand erosion resistant elastomeric erosion protection coatings, since they are very difficult to smooth out with abrasive sanding. For example, elastomeric polyurethane coatings containing no filler or low concentration of fillers tend to "smear" or "gum up" when abrasive sanding is used. These coatings will be extremely tiring for a worker or soldier to sand the large rotor blade in the repair procedure.

Hand Sandable Embodiment

To be practically repairable in the field, the new erosion protection system of this embodiment should preferably be sandable by hand in the field, on the aircraft, without the need to remove the rotor blade from the aircraft. In one preferred embodiment, the coating is made to be hand sandable on purpose. This is a significant departure from the currently employed erosion protection materials. The conventional erosion protection method strives to make the elastomeric coatings or resins as erosion resistant as possible, thus making the unfilled or lightly filled/pigmented elastomer extremely difficult to remove by sanding when repair is needed. These materials are not "hand sandable" as defined below. This embodiment discloses the opposite concept in the design of the erosion protection system. In this embodiment, additional fillers are added to decrease the sanding resistance of the basecoat on purpose, and in many applications where sand impingement is encountered, a thin layer of sand erosion resistant topcoat is used on top of the sandable basecoat to form the total erosion protection system. In this preferred embodiment, the thin layer of the topcoat and the thick layer of the basecoat can be sanded with the use of proper grade of sanding medium, yet still achieve high erosion protection against rain and sand erosion. By using this new concept with the added early erosion multi-color warning indicator that will be described in detail below, a field repairable, renewable erosion protection system for protection of the leading edges of airfoils is achieved.

On a helicopter rotor blade or other airfoil-type leading edges having very well defined aerodynamic surfaces, conduct of an electrically or pneumatically powered sanding operation is a dangerous procedure as over sanding can easily damage the composite honeycomb structure underneath the composite skin. Electrical or pneumatic power sanding may be used in a depot environment where experienced personnel routinely perform the sanding procedure, but are not practical for a field repair environment where inexperienced personnel are handing the sanding tasks under non-ideal working conditions. It is preferred to use hand sanding because the human hand can sense the contour of the substrate and dynamically adjust the degree of sanding force against the coating for optimum removal without damage to the substrate. If sanding discs are used for hand sanding, self-adhesive palm sized sanding discs are preferred. Those with self-stick adhesive that can be held securely attached to the palm of the hand are especially useful. Grit sizes between 40 to 200 grits may be used, with 80-120 grits especially preferred. We have found, quite surprisingly, a stiff sanding disc with a center insert, originally designed for metal grinding at high speed, works especially well as an optimal hand sanding disc to sand elastomeric erosion resistant materials. The small rigid center insert, as seen on commercial sanding discs such as 3M Roloc TSM 361F discs, allows the finger to press the sanding disc hard against the elastomeric coatings to effectively remove the coating. A sanding block may be used for less contoured surfaces when the technicians are highly skilled and well supervised.

Examples of some of the preferred tools and accessories for use in the repair kit which will be later described in detail may include: Curved scissors, Roloc sanding discs, and self-stick sanding discs. The sanding of the damaged area may create loose coating debris and powders. These loose powders and debris must be removed from the work surface before the repair resins can be applied. To remove the loose debris and powders, it has been found that different solvents have different cleaning power. A good cleaning solvent does not attack or soften the erosion protection elastomers, but is able to pick up the loose powders effectively. Slower evaporating solvent is preferred as the field repair is conducted outdoor in open air. We have found that non-polar solvent such as toluene and xylene are especially preferred for in the repair procedure. Lint free wipers are preferred for use with the cleaning solvent in this procedure.

2. Application of Primer

If the erosion damage reaches the substrate, an adhesion promoting repair primer is usually required. Afterwards, a basecoat is applied to fill in the cavities, with the aid of the flexible applicator using the application method of deforming the flexible applicator to conform to the contour of the airfoil allowing the basecoat repair resin to be spread with the flexible applicator into the cavities without leaving repair resin on the undamaged portions of the airfoil surfaces. Once the basecoat is hardened then it is followed by application of the topcoat.

When the primer is eroded and the substrate is exposed, the repair primer, which may be an epoxy primer, must be used with great care and precautions to prevent it from being inadvertently deposited on top of the intact original elastomeric coating. It has been experimentally found that if spots or areas of the epoxy primer are left on top of an elastomeric polyurethane erosion resistant coating, the epoxy primer will cause early erosion initiation, probably due to the stiff, high modulus nature of the epoxy base of the primer which is markedly different from the lower modulus of the basecoat causing stressed to develop at the interface which cause cracks and premature failure of the basecoat integrity. Therefore, the primer must be applied only to the exposed substrate areas at the bottom of the cavities without any primer being overlapped onto the undamaged surrounding elastomeric coating surface.

Because of the typical small size of the rain erosion induced damage cavity, depositing the proper amount of primer is a significant challenge which requires skill and practice to achieve. Most paint brushes used in any normal painting jobs are too big for this procedure. Practice of this embodiment preferably includes the use of micro-sized tips or brushes for the repair of erosion protection system. Especially preferred are the tips or brushes that can control the deposit size to about 1.0 mm, 2.0 mm and 3.0 mm in diameter. These dot-placement brushes are very useful in priming the craters, pits, cracks, and holes. They can also be used to apply the primer to an area larger than craters, pits and small holes. For erosion damages that have enlarged to a somewhat bigger area, small width bristle brush can be used. Examples of suitable applicators for applying the primer are Microtip, Microbrush and Ultrabrush manufactured by Microbrush International, Wisconsin, USA.

The repair primer may be formulated from suitable known primer bases including but not limited to epoxy, polyvinyl butyral, polyurethane or other polymer system with good adhesion to the substrate. It is preferred to have a fast drying and fast curing primer so that the erosion resistant coatings can be applied on top of the primer within short time such as one to two hours. When priming, with the special micro-sized brushes, the superfine round tip Microbrush is used to deposit micro dots into the small pits and craters. A larger brush is used for spreading the primer onto bigger areas, preferably using about 3/16" wide strokes to "paint" larger areas with primer. When the primer becomes tack free or cures to proper stage (depending upon the primer base system), it is ready to be coated with the basecoat.

3. Repair of the Basecoat

The basecoat is formulated to cure in a relatively thick film or layer and be flexible. The Repair Basecoat may have a pot life of about 30 minutes to four hours after mixing. This range of pot life provide a reasonable work time for the repair procedure. Longer or shorter pot life may be used depending on the environment and work schedule. The coating gets thicker as time goes on and becomes very viscous, but still spreadable. This dynamic change of viscosity can be used to good advantage to do the repair. When the viscosity is still low (coating still has thin consistency for about the first 30 minutes), the repair resin can be used to deposit a thin layer onto the damaged areas. The fluid coating will spread into the micro-pits and craters and seal the primed surfaces. As the viscosity increases, the repair resin can be used to build up the coating thickness faster as it has less tendency to flow on its own.

For isolated small pits and craters, the Microbrush and the Ultrabrush can be used to deposit the basecoat into the small openings. In contrast to the primer application, the basecoat repair can use heavy, thick deposits. In this case, the Microbrush can deposit a thick layer of basecoat upon one single contact with the substrate without spreading.

On a rotor blade, turbine blade, propeller blade and other fan blades, the thickness of the blade may change along its length, from the inboard section to the outboard section. The blade may also have a twist along the surface. To apply the thick basecoat efficiently in one application, this embodiment discloses the use of a flexible applicator for this purpose. The flexible applicator is bendable along the curvature of the leading edge surface. The size of the flexible applicator can be as big as the area to be repaired. For helicopter rotor blades, the rain erosion damages usually focus around 2 inches (5 cm) on both sides of the leading edge of the blade, while combined sand and rain erosion damages typically occurs within 8 inches (20 cm) on the sides of the leading edge of the blade. Therefore, a flexible applicator with coverage of 8 inches or less on both sides of the rotor blade will be sufficient. Larger size or smaller sizes can be used depending on the actual contour and dimension of the blades.

The flexible applicator can also be used to apply the coating onto the flat surface of the blade. In this case, the edge of the applicator is used like a flat scrapper to smooth out the coating on a flat surface.

The flexible applicator can be made of a semi-rigid, bendable material, which can be metal, plastic, or rubber. It needs to be rigid enough to hold its shape, but flexible enough to bend along a continuously changing curvature. Flexible semi-rigid plastic sheets are preferred. Especially preferred are semi-rigid, flexible plastic sheets with high solvent resistance and good release properties. High density polyethylene and polypropylene sheets are particularly preferred It has been found that one of the simpler forms of the flexible applicator is a 0.010" (0.25 mm) thick high density polyethylene sheet which has the proper combination of being flexible enough to bend along and conform to the curved surface, while still being rigid enough to hold its shape to apply and shape the coating along the curvature. Both polyethylene and polypropylene have excellent solvent resistance and release properties.

FIG. 5 is shown as a photograph because it provides the best visualization of the application technique of this embodiment. The airfoil chosen for illustration is a helicopter rotor blade 60 having a leading edge 62 which has damage cavities 64 in its contoured surfaces. The flexible applicator 66 is made of a 0.010" (0.25 mm) thick high density polyethylene sheet. The flexible applicator edge 68 forms a continuous line contact with the contoured surface of the leading edge using downward pressure indicated by the force vector arrow 70. At the same time the force 70 is applied in the direction of the surface, the flexible applicator is drawn in a direction 72 that is parallel to the leading edge 62. The basecoat repair material (not visible in this view) is under the curved surface of the flexible applicator in a rolling bank of material that is moved ahead of the flexible applicator edge 68 as the applicator is smoothly drawn in the direction 72. The basecoat repair material completely fills the damage cavities 64 as the rolling bank of repair material passes over the cavities. The applicator edge's continuous line contact with the contoured surface of the leading edge does not deposit significant amounts of repair material anywhere except in the cavities 64.

Types of Flexible Applicators

It has been experimentally determined that the curved surface or airfoil repair embodiment is enhanced by the use of a "Flexible Applicator" (FA). In the simplest embodiment the flexible applicator is a flexible plastic sheet. In using the simplest, flat sheet-type of flexible applicator, the coating can be deposited onto the substrate, or onto the applicator, or both surfaces. The flexible applicator is then "dragged" along, or "pulled" along the curvature, generally in the longitudinal direction or long dimension of the airfoil, rotor or blade. It has been found that applying a sufficient amount of repair coating material on both the applicator and substrate surfaces gives a helpful "lubricating effect." This technique allows the flexible applicator to "glide" easily along the curvature of the airfoil surface.

In practicing this embodiment, it has been found that it is preferred to use moderate force to pull the flexible applicator tightly against the substrate surface. By maintaining the force on the applicator, good control of the coating thickness is maintained and there is not excessive build up of the repair coating on an undamaged curved surface of the airfoil being repaired. It has been determined that keeping the flexible applicator wet and lubricated is very beneficial in doing the repair procedure. When the resin becomes dry or the repair resin is exhausted, the repair resin gets sticky and does not break cleanly. The applicator embodiments of FIG. 8 deal effectively with this by incorporating the feature of continuous feed of resin into the surface contact region under the flexible applicator. This combination of desirable characteristics of the flexible applicator technique assures that the aerodynamic characteristics of the airfoil being repaired is not altered by the repair. One important characteristic of this embodiment is the unique ability to fill in the irregularly shaped and sized pits, cracks, craters, and holes in one application on each curved surface. In comparison to conventional method of filling each erosion damage site individually, this method of application results in great savings of time and labor.

The dimension of the flexible applicator needs to be wider and longer than the size of the damage cavities. The dimension of the flexible applicator is such that the semi-rigid, semi-flexible applicator is able to maintain the outside contour of the original curved surface, so that it spread the liquid coating to a thickness not thicker than the original outside contour of the airfoil.

This is very important to an aerodynamically sensitive structure like rotor blade, radome, antenna, fan blade, turbine blade, etc.

The repair resin may be applied onto the leading edge surface first, and then the flexible plastic sheet is positioned over the leading edge and pulled along its surface. Or the repair resin may be applied onto the plastic sheet and then it is pulled over the damaged surface area. Or the repair resin may be applied to both the leading edge and the plastic sheet, and then the plastic sheet is pulled along the leading edge to thin out the resin and squeeze the resin into the holes and craters.

Alternative Flexible Applicator Embodiments

Using the same flexible/conformable scraper blade concept, various hand applicator tools can be designed to fit well with the leading edge structure of various shape and sizes. Such flexible applicators are within the contemplation of this embodiment and various thicknesses, shapes and materials are contemplated as suitable for a flexible applicator so long as they are capable of following the contour of the curved leading edge surfaces. FIG. 6 shows a preformed flexible applicator 70 which is made of suitable plastic or metal and formed into a flexible yet permanent shape of the exact cross sectional outer contour 72 of the cross section of the airfoil 74 being repaired. The edge 76 of the flexible applicator 70 is contoured to be complementary to the outer contour 72 and will function to move a rolling bank of repair material 78 ahead of it as it is moved parallel to and along the leading edge 80 of the airfoil 74 as shown by arrow 82. The wider, open end 84 accommodates the volume the rolling bank of repair material 78 which completely fills in any cavity 86 in the surface 88 of the airfoil 74 being repaired as the flexible applicator is advanced along the leading edge of the airfoil. The shape of this end of the applicator is not limited by any consideration except leaving enough volume to be able to replenish the repair material, ergonomics of the operator and factors relating to how it is manufactured. The material used for this flexible applicator should have elastic memory or sufficient stiffness after it is formed to the proper curvature of edge 76 to be able to wipe any excess repair material 78 ahead of the edge 76 in a wiping or squeegee action. It is understood that the edge 76 could have a arc that is slightly smaller that the leading edge to assure that there is pressure exerted by the applicator in the direction of the surface by the elastic memory or general stiffness of the material. This embodiment is useful for portions of the airfoil structures that a leading edge which has relatively uniform cross section to the over a substantial length of the airfoil. This embodiment is very useful in that it does not rely on delicate adjustments of downward pressure by the operator to maintain a good squeegee action. The tapered outer tip of the rotor blade or wing surface could be finished off with a planar flexible applicator 66 as illustrated in FIG. 5.

Figure 7:
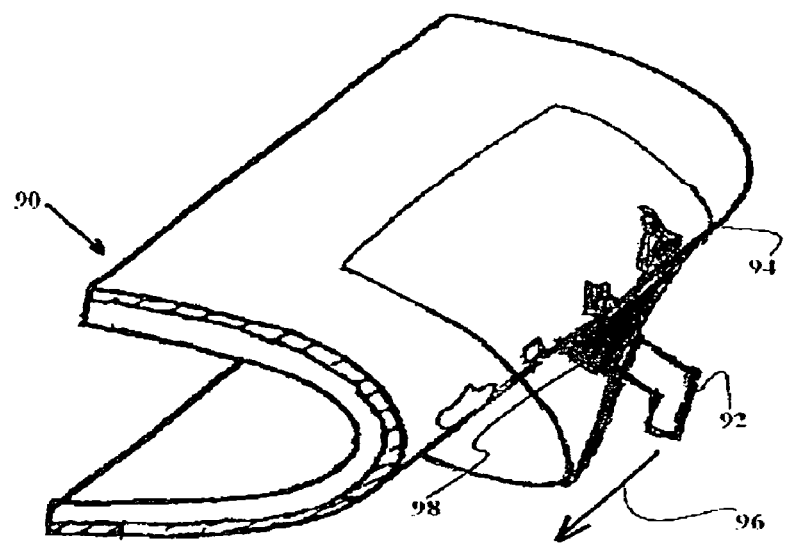
FIG. 7 is partial section of the leading edge portion of an airfoil structure showing sand and water erosion damage being repaired using a specially formed flexible applicator with a handle

FIG. 7 shows a preformed flexible applicator 90 which is substantially similar in most regards to the applicator of FIG. 6 although the reference characters are not repeated. This embodiment includes a handle 92 enables better control by the operator of the orientation, direction and downward force applied toward the airfoil leading edge 94. The directional arrow 96 illustrates again the direction the applicator with the handle is moved. This handle may enable the operator to use only one hand to handle the applicator, allowing the other hand to be free to feed in repair material 98 as needed during repair operations. It also is essentially self tensioning through the natural downward force applied by the operator while keeping it in position against the airfoil leading edge. The handle 92 may be incorporated into the structure of the applicator by any conventional means, including being integrally molded into the applicator body or attached by any suitable method to the applicator body. The shape of the handle can be any suitable shape.

Figure 8:
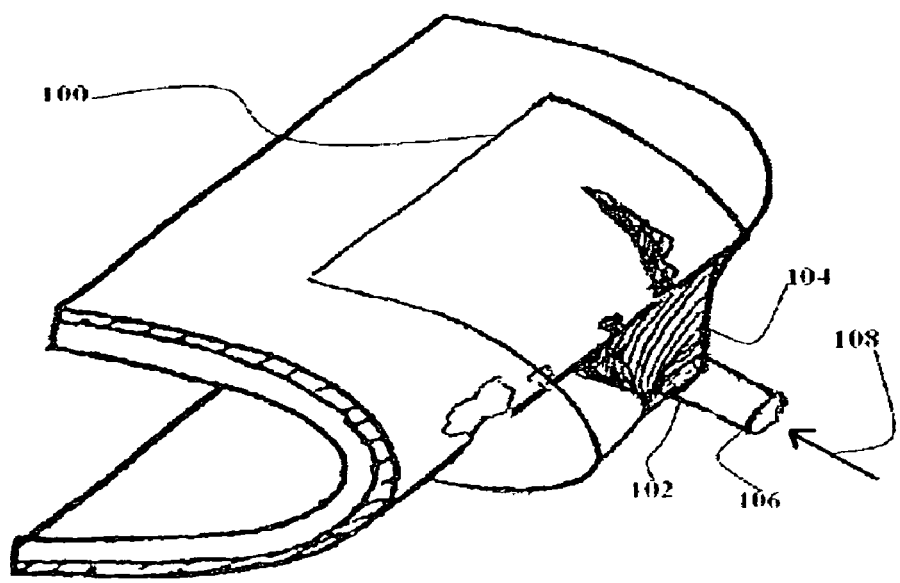
FIG. 8 is partial section of the leading edge portion of an airfoil structure showing sand and water erosion damage being repaired using a specially formed flexible applicator with an inlet for repair fluid built in to the body of the flexible applicator.

FIG. 8 shows another embodiment of a flexible applicator 100 which includes a fluid connector 102 which connects to the portion of the applicator that holds the repair material 104. The fluid connector has adapter 106 to attach to any suitable reservoir of repair material (not shown). This reservoir may be a simple bottle which can manually dispense the repair material 108 as shown by the directional arrow 108 into the fluid connector by squeezing a flexible bottle. It may be a caulking gun configured to feed the repair material into the fluid connector. The dispensing device may be a triggered device for metering either a single fluid or multiple fluids. In an embodiment where the repair material is of the type that has a two part composition, such as a part a base component and a part b curative material, the dispensing devise may be of the type that can meter the proper ratio of part a and part b and optionally also mix those parts together in a mixing apparatus prior to dispensing the repair material through the fluid connector into the working interior volume of the flexible applicator 102 where the rolling bank of repair material is positioned during use of the device.

The embodiments of FIGS. 7 and 8 can also be consolidated such that the handle 92 of FIG. 7 and the fluid connector 102 of FIG. 8 are in a unitary dual function structure. Of course separate handle and fluid connector are also easily designed to fit onto the specialized flexible applicator which can be easily manipulated by a single person. For use as the repair basecoat, the coatings without filler should be elastomeric enough to be erosion resistant to rain or sand. Additional fillers may be added to increase the sand erosion rate.

The repair resin/coating may be 100% solid without solvent or it may contain diluents such as solvent or water. The repair resin may be reactive or non-reactive (fully pre-reacted). It may contain some or all of the following ingredients: resins, curing agents, fillers, fibers, fabrics, viscosity modifier, pigments, hydrolysis stabilizers, adhesion promoters, coupling agents, UV stabilizers, defoamers, wetting agents, etc. The repair resin/coating may be as fluid as a brushable coating up to as viscous as a flowable caulking compound.

For use as sandable, erosion resistant coating, the coating is made from a highly flexible coating composition with additional fillers added at a sufficient level to allow for particulate removal the top surface of the polymer during sanding. The organic polymers suitable for forming the hand sandable coatings can comprise polyacetals, polyureas, polyurethanes, polyolefins, polyacrylics, polycarbonates, polyalkyds, polystyrenes, polyesters, polyamides, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyolefins, polysiloxanes, fluoropolymers, polybutadienes, polyisoprenes, or a combination comprising at least one of the foregoing organic polymers. Exemplary organic polymers are polyurethanes, polyureas and fluoropolymers. It is desirable for the polyurethane, the polyurea and the fluoropolymers to be an elastomer. The aforementioned organic polymers listed above can be blended and/or copolymerized with the polyurethane or polyurea if desired. The base elastomers can be fully reacted such as water based polyurethane, fully reacted thermoplastic elastomers such as polyurethane, TPR (Thermoplastic rubber), EPDM rubber, nitrile rubber, chlorinated rubber, butyl rubber, SBR (styrene butadiene) rubber, fluoroelastomer, silicone rubber, natural rubber, etc. The most preferred elastomer is polyurethane and fluoroelastomers The isocyanates in the polyurethane elastomers can be aromatic or aliphatic. Useful aromatic diisocyanates can include, for example, 2,4-toluene diisocyanate and 2,6-toluene diisocyanate (each generally referred to as TDI); mixtures of the two TDI isomers; 4,4'-diisocyanatodiphenylmethane (MDI); p-phenylene diisocyanate (PPDI); diphenyl-4,4'-diisocyanate; dibenzyl-4,4'-diisocyanate; stilbene-4,4'-diisocyanate; benzophenone-4,4'-diisocyanate; 1,3- and 1,4-xylene diisocyanates; or the like, or a combination comprising at least one of the foregoing aromatic isocyanates.

Useful aliphatic diisocyanates can include, for example, 1,6-hexamethylene diisocyanate (HDI); 1,3-cyclohexyl diisocyanate; 1,4-cyclohexyl diisocyanate (CHDI); the saturated diphenylmethane diisocyanate known as H(12)MDI; isophorone diisocyanate (IPDI); or the like; or a combination comprising at least one of the foregoing isocyanates.

Other exemplary polyisocyanates include hexamethylene diisocyanate (HDI), 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, 2,4- and/or 4,4'-diisocyanato-diphenyl methane and mixtures of these isomers with their higher homologues which are obtained by the phosgenation of aniline/formaldehyde condensates, 2,4- and/or 2,6-diisocyanatotoluene and any mixtures of these compounds.

In one embodiment, derivatives of these monomeric polyisocyanates can be used. These derivatives include polyisocyanates containing biuret groups as described, for example, in U.S. Pat. Nos. 3,124,605, 3,201,372 and DE-OS 1,101,394; polyisocyanates containing isocyanurate groups as described, for example, in U.S. Pat. No. 3,001,973, DE-PS 1,022,789, 1,222,067 and 1,027,394 and DE-OS 1,929,034 and 2,004,048; polyisocyanates containing urethane groups as described, for example, in DE-OS 953,012, BE-PS 752,261 and U.S. Pat. Nos. 3,394,164 and 3,644,457; polyisocyanates containing carbodimide groups as described in DE-PS 1,092,007, U.S. Pat. No. 3,152,162 and DE-OS 2,504,400, 2,537,685 and 2,552,350; and polyisocyanates containing allophanate groups as described, for example, in GB-PS 994,890, BE-PS 761,626 and NL-OS 7,102,524. In another embodiment, N,N',N''-tris-(6-isocyanatohexyl)-biuret and mixtures thereof with its higher homologues and N,N',N''-tris-(6-isocyanatohexyl)-isocyanurate and mixtures thereof with its higher homologues containing more than one isocyanurate ring can be used.

Examples of suitable polyols are polyester polyols, polycaprolactone polyols, polyether polyols, polyhydroxy polycarbonates, polyhydroxy polyacetals, polyhydroxy polyacrylates, polyhydroxy polyester amides and polyhydroxy polythioethers. Exemplary polyols are polyester polyols, polyether polyols, polyesters derived from lactones (e.g., ε-caprolactone or ω-hydroxycaproic acid), or a combination comprising at least one of the foregoing polyols.

Exemplary isocyanate prepolymers are TDI-ether, TDI-ester, TDI-lactone, MDI-ether, MDI-ester, H12MDI-ether, H12MDI-ester and similar prepolymers made from HDI, IPDI and PPDI. The isocyanate prepolymers with low free isocyanate monomers are preferred.

The coating composition also comprises an optional curing agent. Examples of suitable curing agents are aromatic amines that can be used as curing agents are phenylene diamine, 4,4'methylene-bis-(2-chloroaniline), 4,4'methylenedianiline (MDA), 4,4'methylenebis(2,6-diethylaniline), 4,4'methylenebis(2,6-dimethylaniline), 4,4'methylenebis(2-isopropyl-6-methylaniline), 4,4'methylenebis(2-ethyl-6-methylaniline), 4,4'methylenebis(2,6-isopropylaniline), 4,4'methylenebis(3-chloro-2,6-diethylaniline) (MCDEA), 1,3-propanediolbis(4-aminobenzoate), diethyltoluenediamine (DETDA), dimethylthiotoluenediamine; or the like; or a combination comprising at least one of the foregoing aromatic amines. Polyaspartic esters may be used. Polyol curatives are polyester polyols, polycaprolactone polyols, polyether polyols, polyhydroxy polycarbonates, polyhydroxy polyacetals, polyhydroxy polyacrylates, polyhydroxy polyester amides and polyhydroxy polythioethers. Exemplary polyols are polyester polyols, polyether polyols, polyesters derived from lactones (e.g., $\epsilon$-caprolactone or $\omega$-hydroxycaproic acid), or a combination comprising at least one of the foregoing polyols. Imines are useful curatives, including aldimines, ketimines, multifunctional imines.

Atmospheric moisture may serve to cure solely or may catalyze the reaction between the polyurethane and the curing agent. This is referred to as moisture cure. For aqueous coatings, polyurethane dispersions can be used with or without curing agents. The crosslinking of aqueous polyurethane dispersions may be accomplished by the use of isocyanates, epoxy, or aziridines functional materials.

Other additives useful in the coating compositions include leveling agents, adhesion promoters, coupling agents, defoamers, hydrolysis stabilizers, UV stabilizers, pigments, dispersants, curing accelerators, diluents, or combinations thereof.

In order to exhibit high erosion resistance with the fillers, the basecoat preferably utilizes a coating composition in which the elastomeric base of the repair coating prior to the addition of any fillers has been determined to preferably have a minimum tensile strength of 1000 psi, an elongation at break of higher than 100%, and a Shore A hardness of less than 95 A, more preferred is 200% elongation and most preferred 350% elongation. These properties are generally tested according to ASTM D412-92 or D2370 if a film coating is being tested. Exemplary elastomeric bases along with specialized testing and test methods are as disclosed in U.S. patent application Ser. No. 11/136,827, filed May 24, 2005, which is incorporated herein by reference in its entirety.

The fillers that may be used to render the elastomeric base hand-sandable and will also increase the sand erosion rate for the repair basecoat layer include, but are not limited to, the following list:

silicates (such as talc, clays, (montmorillonite) feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, aluminum trihydrate, graphite, metal oxides (such as calcium oxide (lime), aluminum oxide, titanium dioxide, iron oxide, tin oxide) and metal sulfites, metal powders, metal flakes, metal fibers, milled metal fibers, metal nitrides, graphite, carbon nanotubes, carbon fibers and milled carbon fibers, silica (such as quartz, glass beads, glass bubbles and glass fibers), metal-coated glass spheres, metal-coated hollow spheres, buckyballs, electroactive polymers, antimony-doped tin oxide, carbon blacks, coke, micro-balloons, and oxides, borides, carbides, nitrides and silicates from the group of compounds containing boron, aluminum, silicon, titanium, tungsten, and zirconium compounds.

Examples of organic based fillers can be used include thermoplastic powdery material such as polycarbonate, polyetherimide, polyester, polyethylene, polysulfone, polystyrene, acrylonitrile-butadiene-styrene block copolymer, Teflon, fluoropolymers, polypropylene, acetal polymers, polyvinyl chloride, polyurethanes, nylon and combinations thereof. In general, some useful thermoplastic polymers are those having a high melting temperature or good heat resistance properties. There are several ways to form a thermoplastic abrasive particle known in the art.

The useful fillers have a hardness greater than that of the material forming the continuous phase of the coating. The particle size of the fillers may be from nano-sized to 200 microns, or preferably less than 100 microns. The filler content in the hand sandable coating, based on the total solid weight, can range from 10% by weight to 90%, depending on the interaction of the fillers and the base elastomers. Preferred is 20% to 80% by weight and more preferred is 30% to 70% by weight.

The surface gloss of the basecoat may be gloss, semi-gloss or matte. In some applications, the repair basecoat may be used without additional topcoat. For those applications that require a different surface gloss or different functional surface properties, another topcoat layer may be applied. The topcoat may be used to change the surface gloss, surface texture, or surface properties, such as antistatic or electrical conductivity. As earlier described, the topcoat may also be formulated to provide higher erosion (sand and water) resistance and applied over a basecoat. In the preferred embodiment, the sandable erosion resistant basecoat layer constitutes at least 50% of the total coating thickness.

If the coating is 100% solid, one application with this procedure will fill in the cavities of the damage sites to their full height. If the coating contains solvent, the dry coating thickness depends on the dry solid content of the coating. In this case, a second application may be applied to build up the dry film thickness at the damage sites. Even though the evaporation of the solvent left very slight indentations at the damage sites, one application of the basecoat with the unique flexible applicator was able to repair the rotor blade quickly and the helicopter was able to continue flying in a short time period with no detrimental aerodynamic effects on the rotor blade.

The basecoat described here is used to fill in the erosion and impact damage sites and cavities.

We have found a very efficient method to repair the deep craters, pits and holes formed by erosion and impact damages. First, the repair resin is formulated so that there is a somewhat greater degree of "body" to it at the time of repair. The repair resin can be thixotropic, shear thinning, or simply having at least moderate viscosity. "Moderate viscosity" means that the repair resin can be brush applied and does not flow away from the applied surface. The repair resin can preferably be reactive, in which case the viscosity increases with time after the components are mixed together. The repair resin can also be nonreactive, being a fully reacted resin dissolved in solvent or water.

In practicing this invention, the repair resin/coating may contain special effect fillers, additives, fibers, fabrics to provide special functions and properties. If the added filler reduces the erosion resistance of the resin/coating, another layer of the topcoat with higher sand or rain erosion resistance can be applied on top of the repair resin/coating. In this case, the repair procedure comprises the application of primer (optional), the basecoat and the topcoat. The topcoat may be formulated to provide the desired color, gloss and erosion resistance, but in general not hand sandable, by the definition of this invention. The invention may also be applied to single or multi-layered coating systems.

Hand Sandable Elastomers Testing Techniques

One method to determine whether a coating is hand sandable is to use a hand sanding test. Another method is to use a mechanical particulate erosion test or a Taber Abrasion apparatus and then correlate to the ease of the hand sanding.

Hand Sanding Test

The coating materials are either spray coated onto the substrate or glued to the substrate with a double faced permanent pressure sensitive adhesive. A 3" diameter sanding disc, 3M Roloc TSM 361F, with 80 grit aluminum oxide abrasive, is to be used as the sanding medium. The disc is stiff with metal hub at the center. The disc is bent on both side with fingers, and the middle section is pressed down against the elastomeric coating surface by using two central fingers. Using moderately firm pressure, the sanding is done with a timer clock for one minute. The sanding was focused in a small area about 1.5"×3" in dimension. The weights before and after the hand sanding were recorded.

COMPARATIVE EXAMPLE 1

Caapcoat Black B-274, a sprayable rain erosion resistant coating manufactured by Caap, Inc. was sanded as in the above procedure. The coating felt gummy, with a lot of resistance to sanding. The sanding disc got hot after about 15 seconds of hand sanding. Only trace amount of sanding powder/debris was obtained. The arm used in the hand sanding felt sore and tired after 40 seconds. The weight loss after one minute of sanding was 0.029 grams

COMPARATIVE EXAMPLE 2

Caapcoat FP-200, a gray sprayable rain erosion resistant basecoat used in a basecoat-topcoat FP-250 coating system, was hand sanded. The coating felt gummy, with a lot of friction. The hand got tired after about 40 seconds. Low sanding dust was observed. There was some heat built up around 30 seconds. The weight loss after one minute was 0.040 grams.

COMPARATIVE EXAMPLE 3

Caapcoat White, a gloss white sprayable rain erosion resistant coating, was sanded. Results were similar to Comparative Example 2. The weight loss after one minute was 0.022 grams.

COMPARATIVE EXAMPLE 4

Caapcoat Fluoroelastomer V, a gray sprayable elastomeric rain erosion coating, was sanded. The film used for the sand test was 0.002" thick due to the low solid content of the coating. The coating was sanded. The film ripped through easily due to low film thickness. However, poor sandability with very low sanding dust was observed. The weight loss after one minute, including the ripped pieces, was 0.050 grams.

COMPARATIVE EXAMPLE 5

Chemglaze M331, a gloss black sprayable rain erosion resistant coating manufactured by Lord Corporation, was sanded. The coating produced very low sanding dust after one minute. The hands get tired after about 50 seconds. The weight loss was 0.024 grams after one minute.

COMPARATIVE EXAMPLE 6

A piece cut from a Task L-101 molded boot manufactured by Task Inc. was sanded. The sanding disc got very hot in about 7 seconds. The sanding had to be continued by switching fingers to be comfortable. The weight loss was 0.062 grams after one minute.

COMPARATIVE EXAMPLE 7

3M 8545 tape, a black molded erosion resistant polyurethane sheet manufactured by 3M Company, was sanded. The sanding disc got very hot in 15 seconds. The material felt gummy, with trace of sanding dust rolled up together in lumpy form. The weight loss was 0.028 grams after one minute.

COMPARATIVE EXAMPLE 8

3M 8667 tape, a black molded erosion resistant polyurethane tape with pressure sensitive adhesive backing, was sanded. There was a lot of friction. The sanding disc got very hot in 15 seconds. The trace sanding dust rolled up into small lumps. The weight loss was 0.018 grams after one minute.

As seen in the above Comparative Examples, a person trying to sand a small 1.5"×3" area for one minute using the current commercial erosion resistant coating could not remove much material, at the same time, the person felt tired, exhausted and also encountered uncomfortable heat generated in very short period of hand sanding. Thus when trying to utilize the materials of the Comparative Examples 1-8, it would not be practical or even possible to conduct a field repair of a rotor blade, which may measure about 20 feet long.

The hand sanding properties are determined by the total filler loading. As the filler loading increases, the polymeric film on top of the elastomer can be broken away and form loose debris, thereby making the hand sanding easier to perform. Because each filler has its own density and surface properties, the interaction of filler and the base elastomer varies and can be determined by experimental trials.

In contrast with the above Comparative Examples, a good hand sandable coating produced loose debris in powder form, with substantial amount of debris left on the coating surface after sanding, instead of being trapped inside the abrasive particles on the sand paper. In similar procedure by the same person using the same technique, the weight loss of the hand sandable coating is higher than 0.080 gram, preferably higher than 0.100 grams, and even more preferably higher than 0.150 grams.

Figure 9:
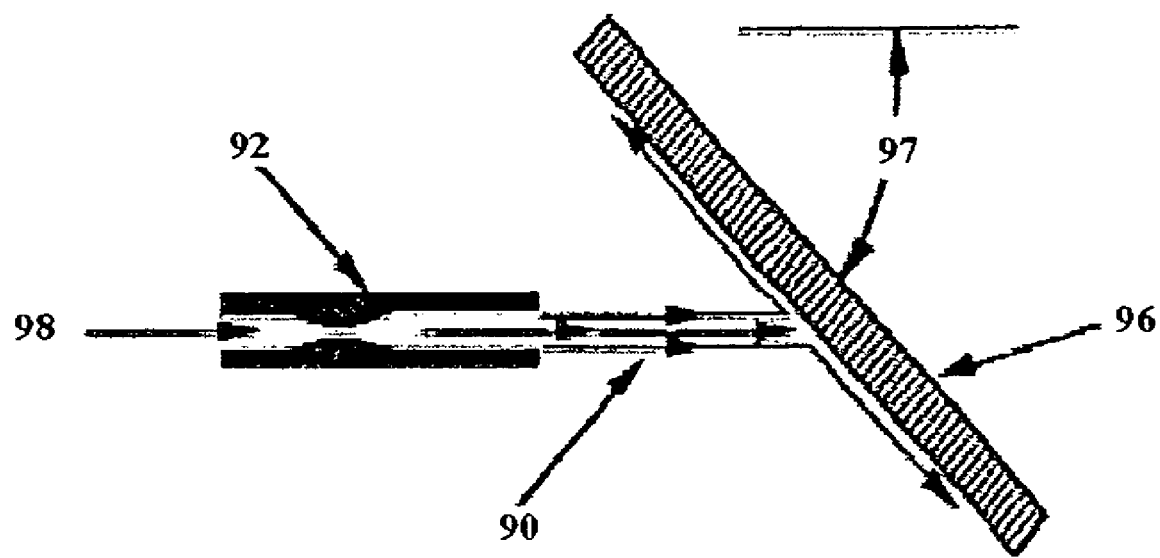
FIG. 9 is a schematic representation of a method of testing sand erosion resistance.

FIG. 9 illustrates an example of the mechanical sand erosion apparatus as practiced in the Particle Erosion Test Apparatus, operated by the University of Dayton Research Institute, Dayton, Ohio. In this test, particles 90 are accelerated in a small diameter (approximately 0.25-inch) high-speed gas jet 92 and directed onto a test specimen 94 as illustrated in FIG. 9 Since the diameter of the jet is smaller than the test specimen area, the specimen holder and jet are articulated so that the test specimen 96 is moved through the jet in a uniform manner. This articulation provides a uniform particle loading (particle mass intercepted per unit surface area) over square area of approximately 316 cm2 (i.e., 7.0-inch square). The inner 6 inch square is considered valid test area. For the sand erosion test using a flat 1"×1" specimen, the net sand erosion exposure area is a circle of 2.0 centimeter.

Compressed air 98 provides the transport gas stream with regulators and pressure transducers to measure and control the pressure at the nozzle inlet. Particles are metered into the transport gas stream from a pressurized screw feeder system. Since the screw feeder provides a very accurate and uniform particle flow, the particle mass applied to the specimen is determined by the run time based on prior calibration of the screw feeder.

Velocity is determined as a function of the nozzle inlet pressure by prior calibration. Thus, for a given test, a specific test velocity can be selected from this velocity versus pressure calibration. Particle size, velocity and impact angle 97 can be controlled independently. This provides an excellent capability to parametrically evaluate the response of critical materials and coatings to solid particle impact effects. Materials from such components as rotorcraft blade coatings, leading edges, windscreens, radomes, paints, and any special coatings can be evaluated in a well-controlled laboratory environment under realistic particle impact conditions.

The Particle Erosion Test Facility differs from the real flight environment in that the specimen is stationary and the particle field is moving at the specified impact velocity. Whereas the key parameters in the flight environment are the static cloud mass concentration (mass or volume of particles per unit volume) and velocity, in the particle erosion facility the key parameters are the particle mass loading and velocity. The relationship between the mass loading in the test facility, and dust cloud concentration, impact velocity and time in the flight environment is as follows:
Mass Load=Concentration*speed*time (*unit conversion factors).

Specimen size of 1 inch square is used to determine the sand erosion rate. The sand erosion was conducted with dry silica sand that have been sieved to 177-250 microns (um), Sand is sieved from F-series unground silica from U.S. Silica at a mean particle stream velocity of 500 miles per hour, using an impact angle of 30 degrees. The mass of impinging particles is set at 10 grams per square centimeter.

In practicing this invention in sandy environments, a layer of high sand erosion resistance elastomer is used on top of the sandable basecoat layer. To maintain the sandability, it is preferred to let the sandable basecoat occupy at least 50% of the total coating thickness. In general, it is preferred to use 0.004" or thinner layer of the topcoat. In this embodiment, the sand erosion will erode the top layer, and then the basecoat and primer. When the basecoat is exposed, the erosion damage is first covered with a renewable sand erosion resistant coating. When the basecoat is eroded, it is easily sanded down and repaired with the procedure disclosed in this invention.

In one embodiment, the basecoat is configured to have a sand erosion rate (mass weight loss) of greater than 0.024 grams when tested according to the Particle Erosion Test Apparatus under 500 mph, 30 degree impact angle, 1"×1" specimen size, with 177-250 micron sand particles, more preferably greater than 0.040 grams, It is even more preferred to have the basecoat configured to have sand erosion rate of higher than 0.050 grams for better hand sandability.

In another embodiment, the basecoat is configured to have a sand erosion rate (mass weight loss) of greater than 0.024 grams, and at the same time contains a topcoat layer of having a sand erosion rate of less than 0.020 grams. It is more preferred to have a basecoat layer with sand erosion rate of higher than 0.040 grams, and a topcoat layer with a sand erosion rate of less than 0.015 grams. It is even more preferred to have a basecoat with sand erosion rate of greater than 0.050 grams.

For use in the water environment without sand erosion concerns, the basecoat layer containing filler that retains good rain erosion resistance can be used alone, forming a sandable rain erosion protection layer.

Application of the Repair Topcoat

For minor damage situations where the erosion has only removed the topcoat and exposed the underlying basecoat, these areas need only topcoat repair. In addition, pits and craters smaller than 1/16" can also be repaired by repairing the topcoat only. Slightly damaged surfaces can be wiped clean with solvents such as xylene, toluene, butyl acetate or MEK (methyl ethyl ketone).

Early Erosion Warning System Embodiment

This embodiment discloses the use of contrasting color in forming the airfoil erosion protection system. The coating system may comprise of a primer of color A, a basecoat of color B, and an optional topcoat of color C. The colors of A, B, and C are formulated to provide a color contrast so that when the erosion reaches at each layer, it provides a visual warning and indication of the need for repair. The use of primer is optional, as some basecoat resin systems may possess sufficient adhesion that no primer is needed. In some cases, the coating system may contain only primer and basecoat, or in others only basecoat and topcoat.

In one embodiment, the basecoat is formulated to be in grayish color to provide contrast to the matte black topcoat. This serves as an Early Warning Indicator for erosion damage. The service life the rotor and its elastomeric protective coating can be greatly increased if routine repair procedures incorporate regular inspection for any visual indication of damage and if any is found, four to six repair layers of matte topcoat are sprayed whenever the gray basecoat is exposed to prevent any further erosion of the basecoat. The matte black topcoat is designed for use as a regular maintenance touch-up coating. It is to be used whenever the gray basecoat becomes visible.

In routine use, a repair sprayable topcoat is applied whenever the topcoat is eroded away and the gray basecoat is shown. The topcoat is sprayed while the rotor blade is still on the aircraft, in the field. According to the repair method embodiment, the spraying of the topcoat is used as the first line of defense against erosion damage.

The topcoat may be applied by brushing, dipping or spraying. If an underlying repair basecoat has been applied, the heavy thickness of the basecoat makes it preferred to allow time for the solvent to flash off from the basecoat before the topcoat is applied. Depending on application environment, one to two hours waiting time is generally sufficient. To obtain the best matte appearance, spraying is the preferred application method.

Spraying of the coating can be accomplished by any of the known spraying methods, including, but not limited to trigger sprayer, air powered pressure sprayer, propellant-powered sprayer, aerosol sprayer, pump sprayer, etc. For field repairs away from a pressurized air supply source, a small disposable hand trigger sprayer or aerosol propellant powered sprayer is especially preferred. An example of suitable propellant powered sprayer is the Preval Paint Sprayer (Spray Gun). The Preval Paint Sprayer includes a propellant-filled power unit for the sprayer and a container for the paint.

Typically a single spraying pass of the matte topcoat deposit about 0.0005" (0.5 mils) of dried topcoat. Although it may vary with severity of damage it has been found that 4-6 spraying layers (0.002-0.003") are used to maintain the erosion resistance of the coated blades after repair. The topcoat can be sprayed as many coats as needed. To maximize the sand erosion resistance, a topcoat with low filler content, high sand erosion resistance is preferred. After repair, a rotor blade with renewed erosion resistance is placed back to service.

Helicopter Rotor Blade Field Repair Example

An experimental sprayable coating system was prepared for application on helicopter rotor blades. The coating system contains a green epoxy primer, a grayish black filled basecoat, and a matte black topcoat. The colors of Green (primer)/Grayish Black (basecoat)/Matte Black (topcoat) forms the Early Erosion Warning Indicator system.

The basecoat was an ambient temperature curable coating system comprising polyurethane with high levels fillers. When hand sanded for one minute as described in the earlier hand sanding test, the basecoat has a weight loss of 0.204 grams and generated a lot of loose powder in 5-10 seconds. There was no heat built up during the one minute hand sanding. When this basecoat was sand tested at UDRI, the 1"×1" UDRI sand test erosion rate was 0.058 grams.

The topcoat is an ambient temperature curable polyurethane. The topcoat is not hand sandable, with a weight loss of 0.031 grams when subjected to hand sanding test for one minute. The topcoat also has very good rain erosion resistance and sand erosion resistance.

A rotor blade was spray coated with a 0.001" thick of green epoxy primer, a 0.017" thick grayish black, filled elastomeric polyurethane basecoat, and a 0.002" thick polyurethane matte black topcoat layer, containing carbon black filler.

During a flight test, the rotor blades encountered severe sand erosion and stone and gravel impact damage during operation in a desert environment. The damage appeared as numerous pits, craters, cracks and holes. The damaged blade surface had a mixture of visible colors indicating damage to the different colored layers. The colors were bright gray (substrate metal), bright green (primer), grayish black (basecoat), and matte black (topcoat). The colors were of good contrast and the various degree of erosion/impact damages were easily visible during an inspection.

The blade was sanded with 80 grit sand paper. A solvent wipe using a lint free wiper cloth was used to clean up the loose sanding dust. A Repair Primer was mixed and brushed onto the exposed metal sites with a small brush trimmed down to ⅛" tip. Any excess primer was wiped clean with the solvent wipe. After curing for about one hour, a Repair Basecoat was mixed. The urethane Repair Basecoat had a brushable viscosity as mixed, gradually increasing to pasty consistency, and eventually to gel-like state. The viscosity increase was used to deposit the liquid repair resin onto the various sizes of damage cavities.

Various techniques and tools were tried for use on the airfoil surface to fill in the numerous tiny holes and craters on the leading edge. It was later found that by bending a semi-flexible 0.010" thick high density polyethylene sheet, the sheet can function as an effective Flexible Applicator (FA) sheet in a special way along the leading edge, the numerous pits, craters, and holes were filled in one simple operation. We found that by applying the brushable repair basecoat onto both the leading edge and the FA, a lubricating effect happened and the repair efficiency increased. Normally, one pass of the FA was able to fill in most of the holes and cracks. For some areas with deeper damage, an additional pass was applied after the first coat dried.

The repaired leading edge was left to dry and cure for about one and half hours. The repair topcoat was mixed and sprayed 4 to 6 passes using a disposable Prevail spray gun. After overnight cure, the repaired rotor blades looked very good and the helicopter was ready to fly again. This repair procedure was conducted in the open airfield, with the rotor blades still mounted on the aircraft, using a staging platform to lift the workers up and down.

The repaired aircraft continued to fly for very long time with regular touch-up repair procedure of this invention. The erosion resistant coating system, the repair resin and the repair procedure of this invention in combination provided more than 30 times improvement over the polyurethane tape products.

This example demonstrates the successful combination use of an early erosion warning system, the primer repair procedure, the basecoat repair procedure and the topcoat repair procedure.

Example of a Repair Kit

A Repair Kit for Airfoil Elastomeric Leading Edges is a very useful and novel combination of the particular materials described herein packaged in convenient carrying package for easy transport by mobile maintenance teams. The Repair Kit will preferably contain at least the following items: 1) A Flexible Applicator and 2) Repair Material which includes at least one of the following: repair primer, repair basecoat or repair topcoat, depending upon the type of damage encountered. For applications not needing a topcoat, only the basecoat and optionally a primer is included. For applications without need of basecoat repair, only the repair topcoat needs to be included. For applications both basecoat and topcoat, both repair materials are include as well as the optional primer. The Kit may also optionally include any of the following items: special lint free wiper towels, curved trim scissors, disposable gloves, respirators, special selected sanding discs, solvents such as xylene, squirt bottle, disposable ½" brushes, disposable Microbrushes, disposable Ultrabrushes. The Kit may be housed in any convenient package, for example, paper carton, plastic storage container and/or a plastic carry-on container for easy transport in military mission use.

ALTERNATE EMBODIMENTS

While solvent stripping is not the preferred method for field repair, the repair methods disclosed in the embodiments herein are compatible with the solvent stripping coating removal method in the proper work environment. For example, solvent stripping in combination with the repair method embodiments can be practiced satisfactorily in a depot facility. For certain substrates such as radomes, sand blasting or other specialized media blasting techniques may be used to remove damaged material prior to repair as described in various embodiments herein.

Although the embodiments set out herein disclose the methods and materials for use in the airfoil repair procedures, it is readily apparent that the methods and materials embodied can be applied to new erosion protection systems for use on various airfoil leading edge surfaces which benefit from elastomeric erosion protection.

While this patent application describes the repair and the removal of sprayable coating, the same principles apply to molding resins, molded boots, tape, brushable coating, putties, and caulking compounds. These applications should be treated as part of this invention.

What is claimed is:

1. A method of repairing an airfoil surface having an elastomeric protective coating adhered to a portion of said airfoil surface having a plurality of damage cavities caused by sand and water erosion or impact damage comprising:

filling said plurality of damage cavities in said elastomeric protective coating with a repair material of a hand sandable basecoat to fill said plurality of damage cavities to form filled cavities using a flexible planar applicator capable of conforming to the surface of said airfoil surface while being drawn lengthwise along the airfoil surface; and applying a topcoat layer over the filled cavities, wherein the hand sandable basecoat has lower sand erosion resistance than the topcoat layer.

2. The method of claim 1 wherein the contact between the airfoil surface and said flexible planar applicator is a curvilinear line of contact which changes as the flexible planar applicator is drawn lengthwise along the airfoil surface.

3. The method of claim 1 wherein the portion of the airfoil surface containing the plurality of cavities is a surface surrounding the leading edge of said airfoil.

4. The method of claim 1 wherein said hand sandable basecoat constitutes at least 50% of the total thickness of topcoat layer and hand sandable basecoat.

5. The method of claim 1 further comprising a preliminary step of:
sanding the portion of said airfoil surface containing said plurality of damage cavities with abrasive material.

6. The method of claim 1 further comprising applying a primer coat in damage cavities.

7. The method of claim 1 wherein said hand sandable basecoat has an elastomeric base composition having a minimum tensile strength of 1000 psi, an elongation at break of at least 100%, and a Shore A hardness of less than 95 A as tested before incorporating additional fillers added in sufficient amount to render the elastomeric base composition sandable.

8. The method of claim 1 wherein the hand sandable basecoat disposed surrounding said leading edge surface has a sand erosion rate above 0.020 grams/cm$^2$; and the topcoat layer disposed on top of said hand sandable basecoat has a sand erosion rate below 0.020 grams/cm$^2$.

9. The method according to claim 1 wherein the hand sandable basecoat disposed surrounding said leading edge surface has a sand erosion rate above 0.040 grams/cm$^2$; and the topcoat layer disposed on top of said hand sandable basecoat has a sand erosion rate below 0.015 grams/cm$^2$.

10. The method of claim 1 wherein said flexible planar applicator is a flat sheet of elastomeric or thermoplastic material of selected thickness to allow it to be deformable around an arcuate surface and stiff enough to spread viscous material smoothly ahead of it when drawn through the viscous material.

11. The method of claim 1 wherein said hand sandable basecoat comprises an elastomeric base composition having incorporated therein at least 20 percent by weight of a filler.

12. The method of claim 1 wherein said hand sandable basecoat comprises an elastomeric base composition having incorporated therein less than 90 percent by weight of a filler.

13. The method of claim 1 wherein said hand sandable basecoat comprises an elastomeric base composition having incorporated therein between 20 percent to 80 percent by weight of a filler.

14. The method of claim 1 wherein said hand sandable basecoat comprises an elastomeric base composition having incorporated therein between 30 percent to 70 percent by weight of a filler.

15. The method of claim 1 wherein said filler is selected from a group consisting of silicates, metal sulfates, gypsum, aluminum trihydrate, graphite, metal oxides, metal sulfites, metal powders, metal flakes, milled metal fibers, metal nitrides, graphite, carbon nanotubes, milled carbon fibers, silicas, metal-coated glass spheres, metal-coated hollow spheres, buckyballs, electroactive polymers, antimony-doped tin oxide, carbon blacks, coke, micro-balloons, and the oxides, borides, carbides, nitrides and silicates of the group of compounds containing boron, aluminum, silicon, titanium, tungsten, and zirconium compounds.

16. The method of claim 1 wherein said filler is selected from a group consisting of talc, clays, montmorillonite, feldspar, mica, calcium silicate, calcium metasilicate, sodium aluminosilicate, sodium silicate, calcium sulfate, barium sulfate, sodium sulfate, aluminum sodium sulfate, aluminum sulfate, gypsum, aluminum trihydrate, graphite, calcium oxide, aluminum oxide, titanium dioxide, iron oxide, tin oxide, quartz, glass beads and glass bubbles.

17. The method of claim 1 wherein said filler is an organic based filler selected from group consisting of polycarbonate, polyetherimide, polyester, polyethylene, polysulfone, polystyrene, acrylonitrile-butadiene-styrene block copolymer, Teflon, fluoropolymers, polypropylene, acetal polymers, polyvinyl chloride, polyurethanes, nylon and combinations thereof, wherein the particle size of the fillers are nano-sized to 200 microns.

18. The method of claim 1 further comprising a preliminary step of applying a plurality of primer coats over any airfoil surface exposed within said damage cavities using a fine brush capable of controlling the primer coat deposition to about 1.0 mm, 2.00 mm and 3.00 mm in diameter.

19. The method of claim 1 further comprising a preliminary step of applying a plurality of coats of said hand sandable basecoat to damage cavities using a fine brush capable of controlling the hand sandable basecoat deposition within a range of about 1.0 mm, 2.00 mm and 3.00 mm in diameter prior to said filling step.

20. The method of claim 1 wherein said topcoat layer is from about 0.002 to 0.003 inch thick.

21. The method of claim 1 wherein said topcoat layer is at least 0.0005 inch thick.

22. The method of claim 1 wherein said topcoat layer less than 0.004 inch thick.

23. A method of repairing an airfoil surface having an elastomeric protective coating adhered to a portion of said airfoil surface having a plurality of damage cavities caused by sand and water erosion or impact damage comprising:
filling said plurality of damage cavities in said elastomeric protective coating with a repair material using a flexible planar applicator capable of conforming to the surface of said airfoil surface while being drawn lengthwise along the airfoil surface, wherein said filling step comprises applying a hand sandable basecoat to fill said plurality of damage cavities to form filled cavities; and
applying a topcoat layer over the filled cavities; wherein the hand sandable basecoat has lower sand erosion resistance than the topcoat layer and said hand sandable basecoat constitutes at least 50% of the total thickness of topcoat layer and hand sandable basecoat and said hand sandable basecoat is a polyurethane or polyurea coating composition having incorporated therein at least one filler added at a concentration greater than 20 percent by weight.

24. The method of claim 23 said topcoat layer is a polyurethane or polyurea topcoat layer over the hand sandable basecoat.

25. The method of claim 23 further comprising applying a plurality of primer coats over any airfoil surface exposed within said damage cavities before filling said damage cavities with said hand sandable basecoat.

26. The method of claim 23 wherein said hand sandable basecoat when tested without said filler has a minimum tensile strength of 1000 psi, an elongation at break higher than 100% and a Shore A hardness of less than 95 A as measured at 68° F.

27. The method of claim 23 wherein said filler is an organic based filler selected from group consisting of polycarbonate, polyetherimide, polyester, polyethylene, polysulfone, polystyrene, acrylonitrile-butadiene-styrene block copolymer, Teflon, fluoropolymers, polypropylene, acetal polymers, polyvinyl chloride, polyurethanes, nylon and combinations thereof, wherein the particle size of the fillers are nano-sized to 200 microns.

28. The method of claim 23 wherein the filler is selected from a group consisting of talc, clays, montmorillonite, feldspar, mica, calcium silicate, calcium metasilicate, sodium aluminosilicate, sodium silicate, calcium sulfate, barium sulfate, sodium sulfate, aluminum sodium sulfate, aluminum sulfate, gypsum, aluminum trihydrate, graphite, calcium oxide, aluminum oxide, titanium dioxide, iron oxide, tin oxide, quartz, glass beads and glass bubbles.

29. The method of claim 23 wherein the filler is selected from a group consisting of silicates, metal sulfates, gypsum, aluminum trihydrate, graphite, metal oxides, metal sulfites, metal powders, metal flakes, milled metal fibers, metal nitrides, graphite, carbon nanotubes, milled carbon fibers, silicas, metal-coated glass spheres, metal-coated hollow spheres, buckyballs, electroactive polymers, antimony-doped tin oxide, carbon blacks, coke, micro-balloons, and the oxides, borides, carbides, nitrides and silicates of the group of compounds containing boron, aluminum, silicon, titanium, tungsten, and zirconium compounds.

30. The method of claim 23 wherein the airfoil surface is a part of windmill blades, turbine blades, runner blades, fan blades, compressor blades, propeller blades, vanes, stay vanes, hydroelectric turbines, marine propellers, hydro turbines, gas turbines, tide mills, windmills, compressors, pumps, blower, impellers, propellers, and fans.

31. The method of claim 23 wherein the airfoil surface is a helicopter rotor blade.

32. The method of claim 23 wherein said polyurethane or polyurea coating composition comprises an aqueous polyurethane dispersion with or without curing agents.

* * * * *